United States Patent [19]

Yashiro et al.

[11] Patent Number: 5,233,342
[45] Date of Patent: Aug. 3, 1993

[54] REMOTE CONTROL SYSTEM

[75] Inventors: Kenji Yashiro; Takashi Okamoto, both of Ohta, Japan

[73] Assignee: Pioneer Electronic Corporation, Tokyo, Japan

[21] Appl. No.: 657,803

[22] Filed: Feb. 20, 1991

[30] Foreign Application Priority Data

Jun. 1, 1990 [JP] Japan ................... 2-145060

[51] Int. Cl.$^5$ ............ G05B 23/02; H01H 47/00
[52] U.S. Cl. ................... 340/825.06; 307/131; 340/825.11
[58] Field of Search ......... 340/825.06, 825.10, 340/825.11, 825.16, 825.44, 825.50, 310 R, 310 A, 538; 370/85.6; 307/38, 39, 40, 125, 126, 131, 135; 364/483

[56] References Cited

U.S. PATENT DOCUMENTS

| | | | |
|---|---|---|---|
| 3,842,249 | 10/1974 | Geyer et al. | 340/825.22 |
| 4,333,002 | 6/1982 | Kozak | 307/40 |
| 4,639,609 | 1/1987 | Floyd et al. | 307/38 |
| 4,644,320 | 2/1987 | Carr et al. | 340/538 |
| 4,674,031 | 6/1987 | Siska, Jr. | 307/40 |
| 5,031,082 | 7/1991 | Bierend | 340/538 |

Primary Examiner—Donald J. Yusko
Assistant Examiner—R. Gray
Attorney, Agent, or Firm—Sughrue, Mion, Zinn, Macpeak & Seas

[57] ABSTRACT

A remote control system is employed with a view to realization of automated/unattended control in supervisory control of power equipment, transportion/traffic equipment, building equipment, home equipment, and the like. This remote control system includes a priority rank determination unit and a control unit on the controlled side where a control signal for controlling the operation of a plurality of electric equipment is inputted through a communication system from the control side. The priority rank determination unit determines an operating priority rank of respective electric equipments on the basis of respective power dissipations of the plurality of electric equipments. The control unit operates respective electric equipments on the basis of the operating priority rank thus determined. By controlling the operation of the electric equipment in this way, an accident of interruption of the operation of the entire system resulting from the operation of a specific electric equipment is prevented. Further, since this system judges in advance as to whether or not the operation of a specific electric equipment is proper, thus making it possible to prevent in advance the operation of an interrupter, etc., the supervisory control of the system is always maintained.

9 Claims, 3 Drawing Sheets

REMOTE CONTROL SYSTEM

BACKGROUND OF THE INVENTION

This invention relates to a remote control system for controlling a plurality of electric equipment in controlled stations provided away or distant from a control station, and more particularly to a system for remotely controlling in conformity with respective states of the plurality of electric equipment or states therebetween.

The remote control system is used in the case where equipment located away from each other are coupled by transmission paths, whereby a first piece of equipment controls other pieces of equipment. The first piece of equipment to perform a control operation is on the equipment side where an operator or a monitoring person is present. Such equipment is generally called a control station, a master station, or a master, etc. On the other hand, the other equipment to be controlled is called a controlled station, a slave station, or a remote, etc. which is on the side of the unattended side. The control station and the controlled stations are coupled by transmission paths, so that equipment such as equipment to be controlled, or equipment to be monitored, etc. within the controlled stations from the control station through the transmission paths can be controlled.

As the system of transmitting a control signal from the control station to the controlled stations through the transmission paths, there is the system of mainly coding information to transmit the coded information in a time divisional manner. In addition, there are systems for dividing frequency and for transmitting the divided frequencies. These systems directly transmit information by means of cables, and the like.

Thus, controlled stations to which the control signal is inputted operate or control equipment specified by the control signal.

SUMMARY OF THE INVENTION

It is an object of this invention to provide a remote control system in which a plurality of electric equipment are controlled according to a priority rank of control operation determined on the basis of respective power dissipations thereof to prevent the interruption of the entire system when a specific electric equipment is operated.

A remote control system according to this invention is directed to a remote control system adapted to control a plurality of electric equipments installed on the side of uncontrolled stations on the basis of a control signal transmitted from the side of the control station through a communication system, wherein the remote control system comprises priority rank determination means provided on the side of the controlled stations and for determining a priority rank to operate the plurality of electric equipments on the basis of power dissipations of the respective electric equipment, and control means provided on the side of the controlled stations, wherein when the control signal for operating any one of the plurality of electric equipments each connected through a control bus is inputted, the control means outputs, to the control line, an operating signal for operating electric equipment on the basis of the determined priority rank to control the operation thereof.

In this invention, since an approach is employed to determine in advance a priority rank of the control operation on the basis of respective power dissipations of a plurality of electric equipments to control the plurality of electric equipments on the basis of the priority rank thus determined, it is possible to judge as to whether or not a specific electric equipment is operable without allowing a current to actually flow in the specific electric equipment on the basis of a control signal from the side of the control station to operate it. The interruption of the operation of the entirety of the system based on the operation of a specific electric equipment can be prevented. Further, since it is possible to judge in advance whether or not the operation in a specific electric equipment is proper to prevent the operation of an interrupter, the supervisory control of the system can be always maintained.

DESCRIPTION OF THE PREFERRED EMBODIMENTS

(1) General description

Prior to describing preferred embodiments according to the present invention, a typical remote control system will be first described to facilitate a better understanding of this invention.

Figure 1:
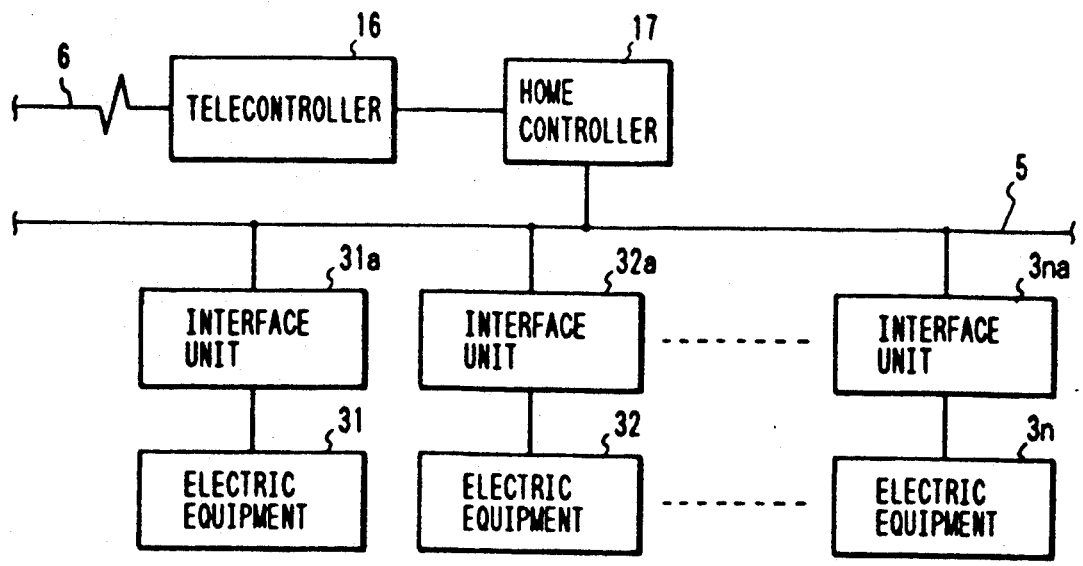
FIG. 1 is a block diagram showing the configuration of a typical remote control system.
Figure 2:
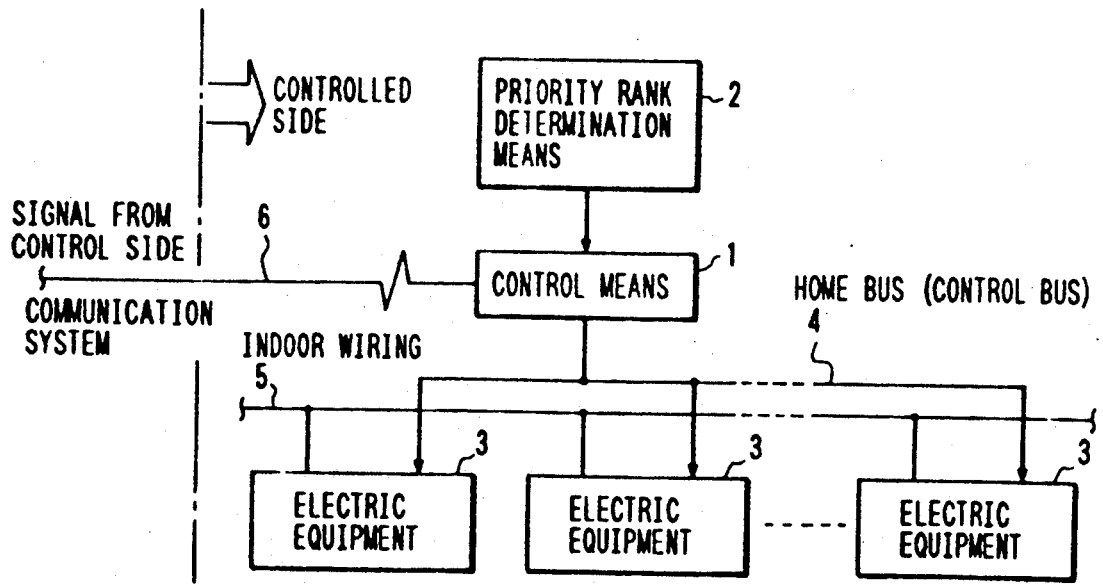
FIG. 2 is a block diagram showing the outline of the configuration of an embodiment according to this invention.

An example thereof is shown in FIG. 1. As shown in FIG. 1, the remote control system is such that an indoor wire 5 is installed within the home and used as a home bus for passing signals. Various electric equipment 31 and 32 to 3n are connected to the indoor wire 5 through a plurality of interface units 31a and 32a to 3na, respectively. Further, a telecontroller 16 for automatically receiving a control signal transmitted through a telephone line 6 from the external is connected to the indoor wire 5. Thus, a home controller 17 carries out an ON/OFF control of various electric equipment 31 and 32 to 3n on the basis of a control signal received by the telecontroller 16.

Further, the interface units 31a and 32a to 32na detect current values delivered to various electric equipment 31 and 32 to 3n caused to be in an ON state on the basis of the control of the home controller 17, thereby to limit the operation of the electric equipment 31 (or 32 to 3n) placed in the ON state when the current value thus detected is above a predetermined value.

The operation of the conventional system constructed above will now be described. Initially, a control signal for operating a specific piece of equipment 31 (or 32 to 3n) within the home is transmitted through the telephone line 6. The control signal thus transmitted is automatically received by the telecontroller 16. This telecontroller 16 transforms the control signal to a system packet to output it to the home controller 17. On the basis of the system packet, the home controller 17 carries out an ON/OFF control of the specific electric equipment 31 (or 32 to 3n). In the ON control of the electric equipment 31 (or 32 to 3n), the home controller 17 detects the value of a current flowing in the electric equipment 31 (or 32 to 3n) to limit the ON operation of the electric equipment 31 (or 32 to 3n) when the detected current value is above a predetermined value. In this way, occurrance of an accident due to an overcurrent flowing in the electric equipment 31 (or 32 to 3n) having a large load current is prevented.

In the control operation of the remote control system, in the case where the number of electric equipment 31 and 32 to 3n subject to control is increased, the time required for transmitting current detection results of respective electric equipment 31 and 32 to 3n from the interface units 31a and 32a to 3na to the telecontroller 16 (or the home controller 17) is prolonged. Prior to limiting the ON operation of the electric equipment 31 and 32 to 3n, an interrupter such as NFB, etc. is operated. As a result, the entire system is placed in a stopped state.

Further, an inrush current (rush current) based on the transient characteristic when respective electric equipment 31 and 32 to 3n are powered is produced. As a result, this inrush current is superimposed on an ordinary current (a rated current at the time of an ordinary operation) of other electric equipment 31 and 32 to 3n which have been already operated, and then exceeds a predetermined current value. Thus, there may occur instances where the entire system is placed in a stopped state.

(2) Description of an embodiment of the invention

A preferred embodiment of this invention will be described with reference to FIGS. 2, 3, 4A and 4B.

As shown as an overview diagram of this embodiment, a remote control system according to this embodiment includes a plurality of electric equipment 3 supplied with power, an indoor wiring 5 on the side of controlled stations and operative in accordance with an operating signal transmitted from a home bus or line 4, control means 1 for transmitting an operating signal from the home bus 4 in accordance with a control signal transmitted from the side of a control station (not shown) through a communication system to control the plurality of electric equipment 3, and a priority rank determination means 2 for determining an operating priority rank of respective electric equipment 3 controlled by the control means 1 on the basis of respective power dissipations of the plurality of electric equipment 3.

Figure 3:
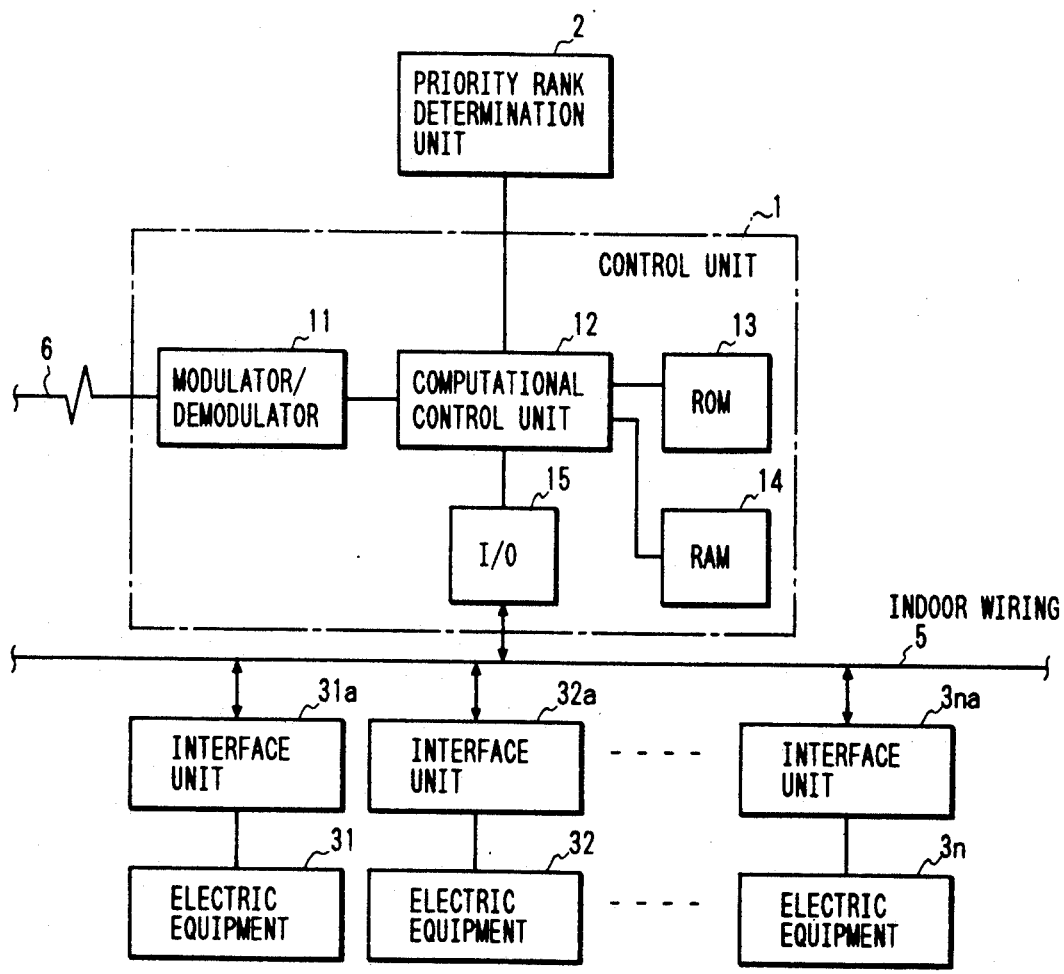
FIG. 3 is a block diagram showing an actual configuration of the embodiment according to this invention.

An actual configuration of this embodiment is shown in a block form in FIG. 3. In this figure, the remote control system according to this embodiment includes a control unit 1 for controlling a plurality of electric equipment 31 and 32 to 3n connected to indoor wiring 5 as one of the home buses installed within the home on the side of controlled stations through a plurality of interface units 31a and 32a to 3na on the basis of a control signal transmitted from the side of the control station through the telephone line 6, and a priority rank determination unit 2 for determining a priority rank for allowing the control unit 1 to operate the electric equipment 31 and 32 to 3n.

The control unit 1 comprises a modulator/demodulator 11 for automatically receiving a control signal inputted from the telephone line 6 to demodulate the received control signal, and to modulate a signal transmitted to the control station which has transmitted an external control signal, a computational control unit 12 for controlling the electric equipment 31 and 32 to 3n on the basis of the demodulated control signal, a ROM 13 in which a control operational program for the computational control unit 12 is stored, and a RAM 14 into which data indicative of a priority rank determined by the priority rank determination unit 2, and data indicative of respective inrush current values of the electric equipment 31 and 32 to 3n, an ordinary current value (a rated current value in an ordinary operating state), addresses, kind, state, and the like are stored.

Figure 4A:
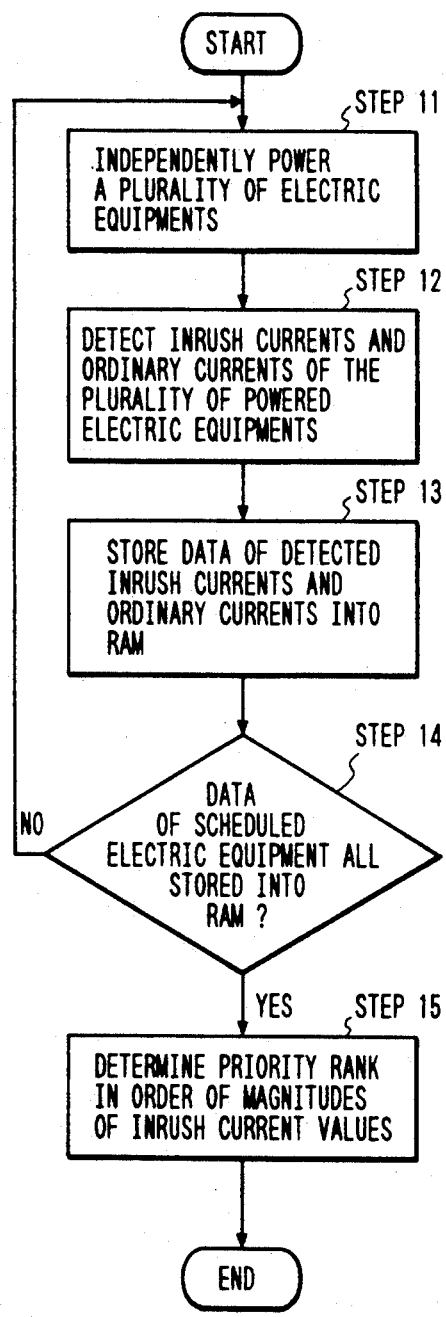
FIG. 4A is a priority rank determination flowchart of the operating flowchart of the embodiment shown in FIG. 3.
Figure 4B:
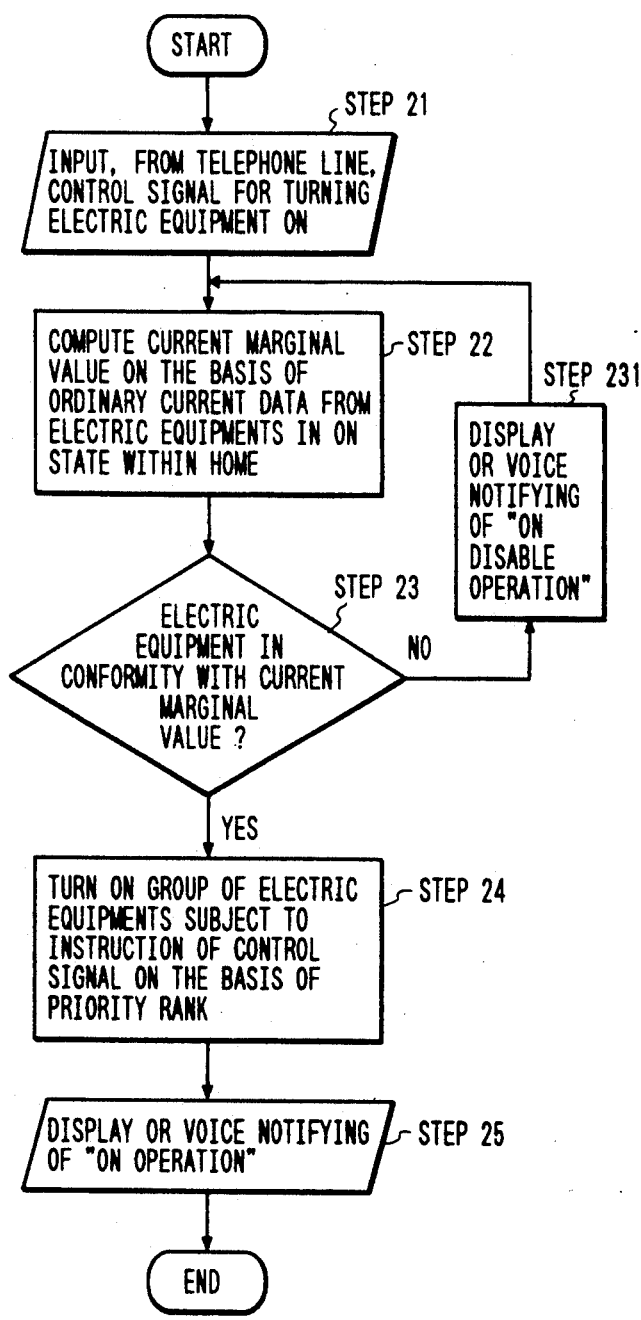
FIG. 4B is an electric equipment operating flowchart of the operating flowchart of the embodiment shown in FIG. 3.

On the basis of the above-mentioned configuration, the operation of this embodiment will be separately described in connection with the priority rank determination operation (Item ①) and the control operation with reference to FIGS. 4A and 4B (Item ②).

① The priority rank determination operation of the priority rank determination unit 2.

On the premise for allowing the entire system to be operative, the control unit 1 causes a plurality of electric equipment 31 and 32 to 3n subject to control to be individually powered through the indoor wiring 5 (step 11). Respective values of inrush currents and ordinary currents of the plurality of electric equipment 31 and 32 to 3n which have been powered are detected (step 12). Data indicative of inrush current values and ordinary current values which have been detected are stored into the RAM 14 along with their addresses (step 13). A judgment is made as to whether or not data relating to the electric equipment 31 and 32 to 3n which are to be subject to control are all stored into the RAM 14 (step 14).

When it is judged at the step 14 that data are all stored into the RAM 14, the priority rank determination unit 2 determines a priority rank of order of operating the electric equipment 31 and 32 to 3n in order of the magnitudes of respective stored inrush current values (step 15).

On the other hand, when it is judged at the step 14 that data are not all stored into the RAM 14, the control operation returns to the step 11 to allow the remaining electric piece or pieces of electric equipment 31 and 32 to 3n to be individually powered to repeatedly carry out the above-mentioned operation (steps 11 to 14).

② The control operation with respect to electric equipment 31 and 32 to 3n of the control unit 1.

In the state where data of inrush current values, and ordinary current values, etc. of the electric equipment 31 and 32 to 3n are stored into the RAM 14 and data indicative of the determined priority rank is stored into the RAM 14, the control unit 1 initiates the control operation with respect to respective electric equipment 31 and 32 to 3n.

In the case where a control signal is transmitted from the telephone line 6 under the above-mentioned state, this control signal is automatically incoming to the modulator/demodulator 11 and inputted thereto (step 21). The modulator/demodulator 11 converts a modulated control signal to a control signal of serial pulses. The control signal of serial pulses thus obtained is converted to two-dimensional information of "0" and "1" by a serial-to-parallel (S/P) converter (not shown). Then, the control signal of the two-dimensional information is outputted to the computational control unit 12.

The conputational control unit 12 to which the control signal of the two-dimensional information has been inputted reads out, from the RAM 14, data of ordinary current values in the electric equipment in an ON state of all the electric equipment 31 and 32 to 3n which are subject to control within the home to determine the total sum of ordinary current values to compute a current marginal value by subtracting the sum total of the ordinary current values from a threshold (step 22). Further, when a plurality of electric equipment 31 (or 32 to 3n) which are subject to the control signal are placed in an ON state, the computational control unit 12 judges as to whether the inrush current value and the ordinary current value of the electric equipment 31 (or 32 to 3n) are in conformity with the above-mentioned marginal value (step 23).

When it is judged that they are in conformity with the current marginal value, the computational control unit 12 controls a plurality of electric equipment 31 (or 32 to 3n) which are subject to the control signal so that they are sequentially placed in an ON state on the basis of the priority rank (step 24). The control for placing the plurality of equipment 31 (or 32 to 3n) in an ON state is carried out by transmitting, from the computational control unit 12, control data to interface units 31a (or 32a to 3na) corresponding to respective electric equipment 31 (or 32 to 3n) through the input/output unit (I/O) 15 and the indoor wiring 5. In the case where a destination address code specified by the transmitted control data becomes in correspondence with an address (stored in advance into the RAM 14) determined in advance, the interface units 31a (or 32a to 3na) take thereinto control data, thus to control corresponding electric equipment 31 (or 32 to 3n) on the basis of the control command of the control data.

The control unit 1 displays or aurally notifies that the respective electric equipment 31 (or 32a to 3na) which will be sequentially placed into an ON state on the basis of the priority rank are in an "ON operating" state (step 25). Such a display or voice notifying is carried out by modulating a display signal or a voice notifying signal outputted from the computational control unit 12 into a predetermined transmission signal at the modulator/demodulator 11 to transmit the modulated display or voice notifying signal to the control signal transmission side through the telephone line 6.

When it is judged at the step 23 that the above-mentioned current values are not in conformity with the current marginal value, the control unit 1 carries out display or voice notifying of "ON disable operation" to effect the control for allowing the electric equipment 31 (or 32 to 3n) subject to the control signal to be placed in an ON state cannot be carried out in the same manner as in the case of "ON operation" (step 231). After display or voice notifying of "ON disable operation" is carried out, the control operation returns to the step 22 to compute a current marginal value for a second time, thus to repeatedly carry out a judgement as to whether or not the electric equipment 31 (or equipments 32 to 3n) subject to control of the control signal is or are in conformity with the marginal value.

(3) Description of other embodiments of this invention

In the above-described embodiment, there is employed an embodiment such that the priority rank determination unit 2 determines a priority rank in order of the magnitudes of inrush current values of respective equipments 31 and 32 to 3n. In addition, an arrangement to determine a priority rank on the basis of the power dissipations of respective electric equipments. With respect to the power dissipations of respective electric equipments, in the case of television, video, etc., power dissipations are judged in terms of the screen size (inch), and in the case of the amplifier, or airconditioner, etc., power dissipations are determined in terms of the output (watt). Namely, the magnitudes of inrush current values are automatically registered by the above-mentioned determined power dissipations at the time of connection of various electric equipments.

The priority rank determined at the priority rank determination unit 2 may be determined in consideration of various states or circumstances of the electric equipments subject to control. For example, an approach may be employed to take a priority rank of a saved energy mode to detect, with elapse of time, brightness of the surroundings where electric equipments are provided to power-adjust brightness of an indoor illumination, or to power only equipment required in the case of carrying out remote instruction of sound recording/picture recording.

Further, as the method of determining the priority rank, a method may be employed such that a user or a person who effects a control through a telephone line designates in advance an electric equipment of high use priority to memorize it to carry out an ON/OFF control of the electric equipments in accordance with the order. In this case, it is required for making memorization in advance to additionally provide a key pad permitting an instruction to the computational control unit 12, and a software for making a memorization into the RAM 14.

In the case where there are electric equipments, etc. intermittently operating such as an electric refrigerator, or pot, etc., an approach may be employed to detect ON/OFF or a quantity of changes in time of an ordinary current as well to calculate power ON timing of new electric equipment to control it.

While an arrangement may be employed in the above-described embodiment to control a plurality of electric equipment 31 and 32 to 3n by the control unit 1, an arrangement may be employed to control the control unit by telecontroller, home controller, or center controller of automation, etc..

The control of electric equipment 31 and 32 to 3n by the control unit 1 may include an adjustment operation of a quantity of power supplied in addition to ON/OFF control of respective electric equipments. For example, there are enumerated a light control (adjustment of light) of an illumination device, and a tone control of an amplifier, etc. In this case, an approach is employed to limit a quantity of power supplied to a predetermined value without conducting an OFF control, thus to effect a control.

While an arrangement is employed in the above-described embodiment such that the control unit 1 individually allows respective electric equipments 31 and 32 to 3n to be actually turned ON to detect inrush current values and ordinary current values of a plurality of electric equipments 31 and 32 to 3n, an arrangement may be employed to integrate inrush current values (and ordinary current values) on the basis of kind and/or state (e.g., screen size, output power, etc.) of respective electric equipments registered in advance without allowing respective electric equipments to be actually turned ON, thus to make an estimation. In this case, the above-mentioned system can be processed on software by the computational function of the control unit. This can be advantageously attained without provision of various hardwares such as a current detector, etc..

It is to be noted that while explanation has been given in the above-described embodiment in connection with the case where electric equipments 31 and 32 to 3n are provided within the home, electric equipment provided in building faculties, factories and other places subject to remote control may be subject to control by the remote control system of the invention.

While an arrangement is employed in the above-described embodiment such that the indoor wiring 5 is used as the home bus, an arrangement may be employed such that a home bus may be provided independently of the indoor wiring or other house-wiring.

In addition, while an arrangement to transmit a control signal transmitted from the external through the telephone line is employed in the above-described embodiment, an arrangement to transmit a control signal by various communication systems such as INS (Information Network System), VAN (Value Added Network), or ISDN (Integrated Service Digital Network), etc. may be employed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A remote control system for remotely controlling a plurality of electric equipment disposed at a first station on the basis of a control signal transmitted from a control station through a communication system, said remote control system comprising:
   priority rank determination means for determining an operating priority rank of said plurality of electric equipment on the basis of respective power dissipations including magnitudes of respective inrush current values of each of the plurality of electric equipment; and
   control means, responsive to said control signal, for operating any one of the plurality of electric equipment each of which are connected to a control line, and for outputting to said control line an operating signal for operating the electric equipment on the basis of the determined operating priority rank to control the operation thereof.

2. A remote control system as set forth in claim 1, wherein said control means comprises a computational control unit for computing a current marginal value from a threshhold and a sum total of ordinary current value in said electric equipment.

3. A remote control system as set forth in claim 1, wherein said control means uses, as said control line, a power supply wiring for delivering power to said plurality of electric equipment, said respective electric equipment being connected through said power supply wiring.

4. A method of remotely controlling a plurality of electric equipment disposed at a first station on the basis of a control signal transmitted from a control station through a communication system, said method comprising the steps of:
   inputting, through said communication system, a control signal for designating at least one AC-operated electric equipment to be turned ON;
   computing a current marginal value on the basis of ordinary current data of the electric equipment being in an ON state; and
   turning the designated electric equipment ON in accordance with an operating priority rank determined on the basis of dissipation current values including inrush current values of each of the electric equipment, if ordinary current data of the designated electric equipment is in conformity with the current marginal value.

5. A method according to claim 4, further comprising the steps of:
   outputting a disable indication signal indicating that the designated electric equipment is being disabled, if ordinary current data of the designated electric equipment is not in conformity with the current marginal value.

6. A method according to claim 4, further comprising the step of storing dissipation current values of the electric 7. A method according to claim 4, further comprising the step of storing dissipation storing ordinary current data of the electric equipment in a memory.

8. A method according to claim 5, wherein said disable indication signal is an acoustic indication transmitted through the communication system.

9. A method according to claim 4, wherein said communication system is a telephone line.

* * * * *